United States Patent
Phillibert et al.

(10) Patent No.: US 12,007,910 B1
(45) Date of Patent: Jun. 11, 2024

(54) RESOURCE PUBLIC KEY INFRASTRUCTURE (RPKI) VALIDATION SYSTEM

(71) Applicant: Amazon Technologies, Inc., Seattle, WA (US)

(72) Inventors: Jonathan Phillibert, Seattle, WA (US); Andrew Lee Newton, Falls Church, VA (US); Gaston Keller, Waterloo (CA); Jun Sung Park, Arlington, VA (US); Samuel Kenney, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 17/532,666

(22) Filed: Nov. 22, 2021

(51) Int. Cl.
 *G06F 12/14* (2006.01)
 *H04L 9/30* (2006.01)

(52) U.S. Cl.
 CPC ........ *G06F 12/1408* (2013.01); *H04L 9/3006* (2013.01); *G06F 2212/1052* (2013.01)

(58) Field of Classification Search
 CPC ......... G06F 12/1408; G06F 2212/1052; H04L 9/3006
 See application file for complete search history.

(56) References Cited

U.S. PATENT DOCUMENTS

| | | | | |
|---|---|---|---|---|
| 11,418,429 | B2* | 8/2022 | Chaturmohta | H04L 45/04 |
| 2010/0284403 | A1* | 11/2010 | Scudder | H04L 45/04 |
| | | | | 370/392 |
| 2020/0021556 | A1* | 1/2020 | Goelitz | G06F 9/5016 |
| 2021/0105250 | A1* | 4/2021 | Grinius | H04L 61/5061 |
| 2021/0160278 | A1* | 5/2021 | Benjamin | H04L 63/1466 |
| 2021/0258256 | A1* | 8/2021 | Wang | H04L 45/748 |

FOREIGN PATENT DOCUMENTS

| | | | | | |
|---|---|---|---|---|---|
| CN | 112003822 A | * | 11/2020 | | H04L 45/02 |
| CN | 112865979 A | * | 5/2021 | | G06Q 40/04 |

* cited by examiner

*Primary Examiner* — Matthew T Henning
(74) *Attorney, Agent, or Firm* — Klarquist Sparkman, LLP (57) ABSTRACT

A caching sub-system downloads and authenticates Resource Public Key Infrastructure (RPKI) cryptographically signed Route Origin Authorizations (ROAs) from a plurality of repositories, forming a VRP set for each repository. When the caching sub-system determines that the VRP count of a VRP set drops to or below a threshold, it substitutes in a last known valid VRP set. A route validating sub-system downloads route information data from one or more global routing tables and calculates the number of valid routes, the number of unknown routes and the number of invalid routes. When the number of valid routes drops to or below a threshold, the route validating sub-system sets an alarm to stop the distribution of VRPs to one or more group of pre-determined routers.

18 Claims, 7 Drawing Sheets

FIG. 2

| Repository URI | Last VRP Count | Time Stamp | Last Version ID | Cache State |
|---|---|---|---|---|
| https://rpki.arin.net | 5023 | 20201009T040404000Z | ID1 | Inactive |
| https://rpki.idnic.net | 2000 | 20201005T060606001Z | ID2 | Active |
| ... | ... | ... | ... | ... |

RESOURCE PUBLIC KEY INFRASTRUCTURE (RPKI) VALIDATION SYSTEM

BACKGROUND

Resource Public Key Infrastructure (RPKI) is a public key infrastructure to support security for routing on the Internet. In one example, RPKI allows owners of an IP space to cryptographically sign the space so that only authorized organizations can advertise. The signing is done through certificates called Route Origin Authorizations (ROAs). The global cache of ROAs is downloaded, verified, and then fed to devices that receive external route advertisements as a consolidated dataset known as a Validated ROA Payload (VRP). If a corrupted VRP dataset is fed to the routers, or if an organization publishes a harmful but valid ROA for their IP space, route advertisements could be dropped causing customer impact.

DETAILED DESCRIPTION

Briefly, the Internet includes an interconnection of autonomous systems (AS) that use a Border Gateway Protocol (BGP) to exchange routing or reachability information. BGP Route Origin Validation (ROV) is used to mitigate security issues in networks by preventing the unintentional advertisement of routes. For example, ROV can help to authenticate that the route advertisements are originated from an expected AS. ROV can use one or more Resource Public Key Infrastructure (RPKI) servers or systems to perform authentication for specified BGP prefixes. If a corrupted VRP dataset is distributed to the routers, or if an organization publishes a harmful but valid ROA for their IP space, route advertisements can be dropped by the routers, which can cause negative customer impact. A route-validation service described herein can prevent the distribution of corrupted VRP datasets (or "sets") to the routers and ensure that proper VRP datasets are distributed to the routers.

In some embodiments, the route-validation service can periodically (e.g., every 5 minutes) download Internet route information from available sources. The sources can be routing tables maintained internally by the service. For example, these routing tables can include route advertisements by routers of an entity (e.g., an ISP) that the service is connected to. The sources can also include global routing tables from public entities, such as RIPE NCC and other sources. The route information can include, for example, a prefix, a prefix length, and an origin AS. The information can be validated and stored in a database. The validation of the routes can result in each route being valid, unknown or invalid. A valid route can include a prefix and AS pair found in a database of route information maintained, for example, by the system. An unknown route can include a prefix that is not among the prefixes or prefix ranges in the database. An invalid route can include a prefix that is found, but either the corresponding AS received is not the AS that appears in the database, or the prefix length is longer than the maximum length permitted in the database. The route validating sub-system can store the count of each category (valid, unknown or invalid).

In some situations, a problem can arise when some route validations result in the route validation states changing from valid to unknown. In these situations, for example, when these routes are advertised to or by routers, some routers transition the route state first from valid to invalid for a short time, causing the routers to perform various maintenance/recovery functions. When there is a higher number of invalid routes, the routers may experience a problem (e.g., high CPU usage) and fail (sometimes referred to as "convergence storm").

In some embodiments, the route validating service can prevent a distribution of VRPs, for example, preventing distribution of VRP sets determined to be bad or that have a number of invalid VRPs surpassing a threshold. This can prevent the "convergence storm". In one example, when the route validating sub-system determines that the counts of valid routes drop significantly, it can send an alarm. In another example, which will be described in more detail herein, when the route-validating service detects that a VRP set, or VRP sets, would cause invalidation or a drop of a predetermined number of route advertisements, the route validating service can also send an alarm. In some embodiments, the alarm can cause or request the suspension of distribution of VRPs to the routers. The alarm can also cause or request an intervention from an operator.

In some embodiments, the system can also include a VRP caching sub-system (or caching sub-system for brevity) that can periodically (e.g., every 15 minutes) download ROAs from some predetermined sources (e.g., from repositories of ROAs). ROAs are digitally signed objects that fix an address to an AS, are signed by the address holder and are based on certificate standards (e.g., X.509 PKI). ROAs can be used in verifying that a prefix or IP address holder has authorized an AS to originate route objects in the inter-domain routing environment for that prefix. ROAs accordingly indicate which AS number (ASN) is approved to start certain prefixes. For example, the VRP caching sub-system can download the ROAs from repositories at selected RIRs. The VRP caching sub-system can then perform RPKI validation on the ROAs. Once a ROA is validated, the resulting object can contain at least an IP prefix, a maximum length, and an origin ASN. This object is referred to as a validated ROA payload (VRP) and can be stored in a database. In some examples, the database can be stored in a cache memory. Additionally, the database can store VRPs per repository. Each entry in the database can include at least the repository name or identification and a count of VRPs last calculated for the repository, and a link to the last known valid set of VRPs. The repository identification can include the URL of the repository. The last known valid set of VRPs can be stored in the same database or stored in a different database in the same cache memory, or in a different database. In some examples, the VRPs can be stored with versioning, where older versions of the data are still maintained. The data can also be stored in files. The RPKI validation produces a state based on an attempt to confirm a valid match between an IP prefix and an ASN. The three possible states are valid, unknown, or invalid—as described above. A service can then access the VRPs and distribute them to routers. In some examples, this service can use an RPKI-to-Router (RTR) Protocol, to distribute the VRPs. As such, this service can be referred to as RTR service. Once receiving the VRPs, a router can use the information to update routes in its table, including allowing or rejecting routes. For example, a router can update its table based on the route validation states.

In some embodiments, the VRP caching sub-system can prevent a corrupted set of VRPs to be distributed to the routers. This can also prevent the "convergence storm" while not causing any suspension of distribution of VRPs. For example, when the caching sub-system detects a precipitous drop in VRPs for a repository, it substitutes in the last stored VRPs or set of VRPs from a database. When the drop is substantial for a set of VRPs for a repository, an entire set of VRPs for that repository can be substituted with the last stored set. This can improve performance. As such, the VRP cache maintains sets of VRPs that are ready for distribution. For example, these sets have acceptable VRP counts. And as a result, the RTR service can continue to have access to sets of VRPs to distribute to the routers.

In some embodiments, the last stored set of VRPs can include an acceptable VRP count. This last stored set can also be referred to as last known good set. For example, an acceptable VRP count can be a number matching or substantially close to the number of valid ROAs for the repository.

In some embodiments, when it is time to promote or distribute the VRPs from the database, the system may first copy the VRPs into an intermediate system or storage (can also be referred to herein as "buckets"). An RTR service can then retrieve the VRPs from the intermediate system or storage and send them to the routers. In some examples, the system can send the VRPs to the routers in stages, for example, in groups of routers. As described in more detail below, the route validating sub-system and the VRP caching sub-system can improve technical reliability and performance of networks, for example, by limiting or preventing corrupted VRP being distributed to routers.

Figure 1:
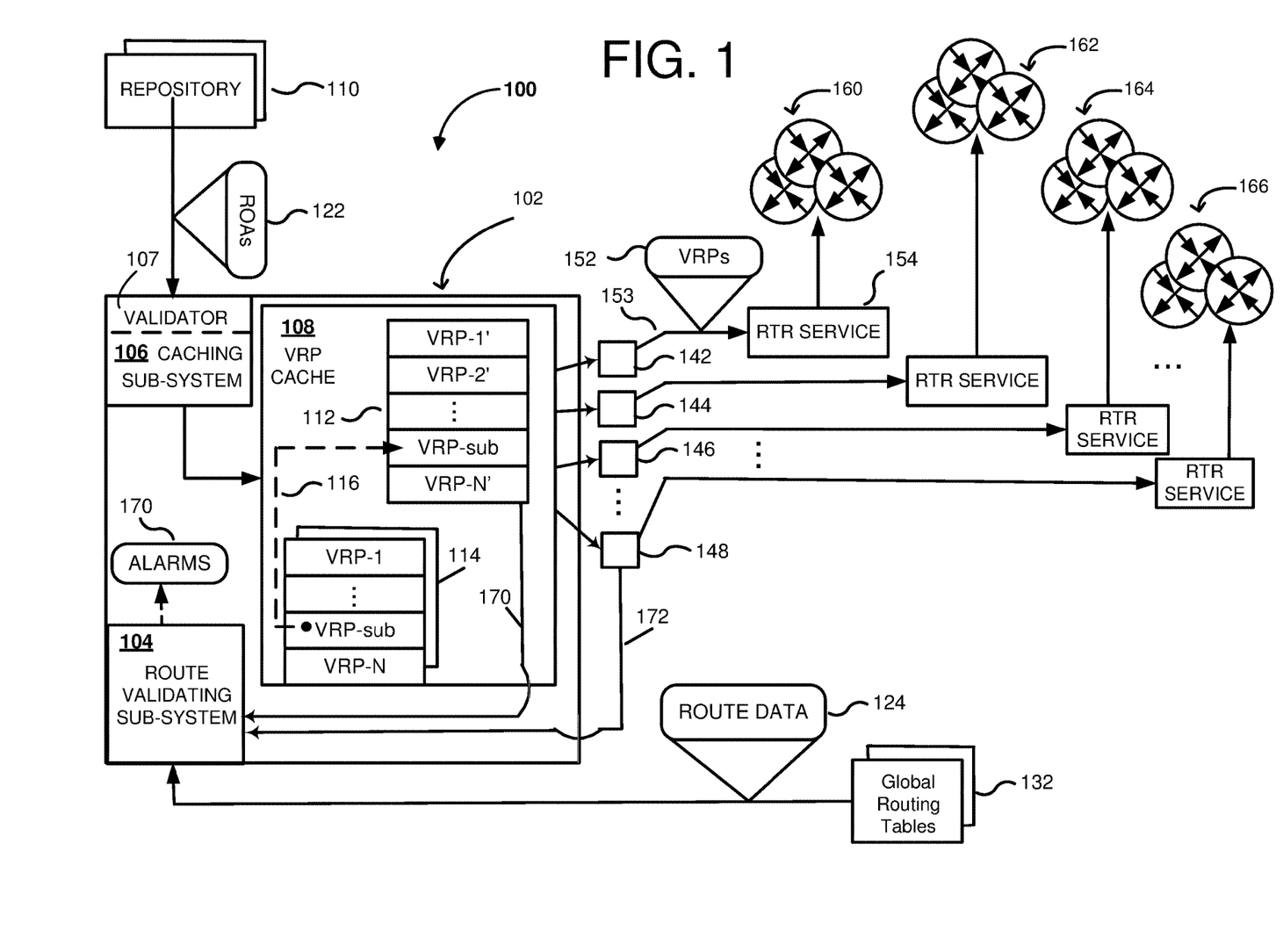
FIG. 1 is an example system diagram for limiting the distribution of invalid routing information to routers.

FIG. 1 shows an example system 100 for improving the distribution of valid routing information to routers. For example, the system 100 can prevent low count of VRPs in a BGP ROV to be distributed to the routers. In the example system 100, a monitoring sub-system 102 can facilitate and monitor the creation and distribution of VRPs to exemplary groups of routers 160-166. In some embodiments, the sub-system 102 can include a route-validating sub-system 104, a caching sub-system 106 and a VRP cache 108. The VRP cache 108 can be any suitable storage device, for example, memory, hard drive, solid state drive (SSD), etc.

The VRP caching sub-system 106 can periodically (e.g., every 15 minutes, or any other pre-determined time) download ROAs 122 from some predetermined sources 110 (e.g., from repositories of ROAs) and perform RPKI on the ROAs 122. For example, the VRP caching sub-system 106 can download the ROAs 122 from repositories at selected RIRs. The VRP caching sub-system 106 can include an RPKI validator 107, which can then perform RPKI validation on the ROAs 122 to authenticate that the ROAs 122 are cryptographically correct. An authenticated ROA can mean it is signed by an authorized entity and the prefix belongs to a correct entity or owner of an IP space, or IP addresses, that cryptographically signed it. Thus, the authenticated ROA ensures that only authorized organizations can advertise in that space, and that the route information is reliable. Once an ROA is validated, the resulting object contains at least an IP prefix, a maximum length, and an origin ASN. This object (e.g., a JSON object) is referred to as VRP and can be stored in a database 114. In some examples, the database 114 can be part of a cache memory 108. In some examples, the VRP caching sub-system 106 can download and validate ROAs repository by repository and can store VRPs per repository in the database 114. In some examples, each repository's VRPs can be stored in one file.

Figure 2:
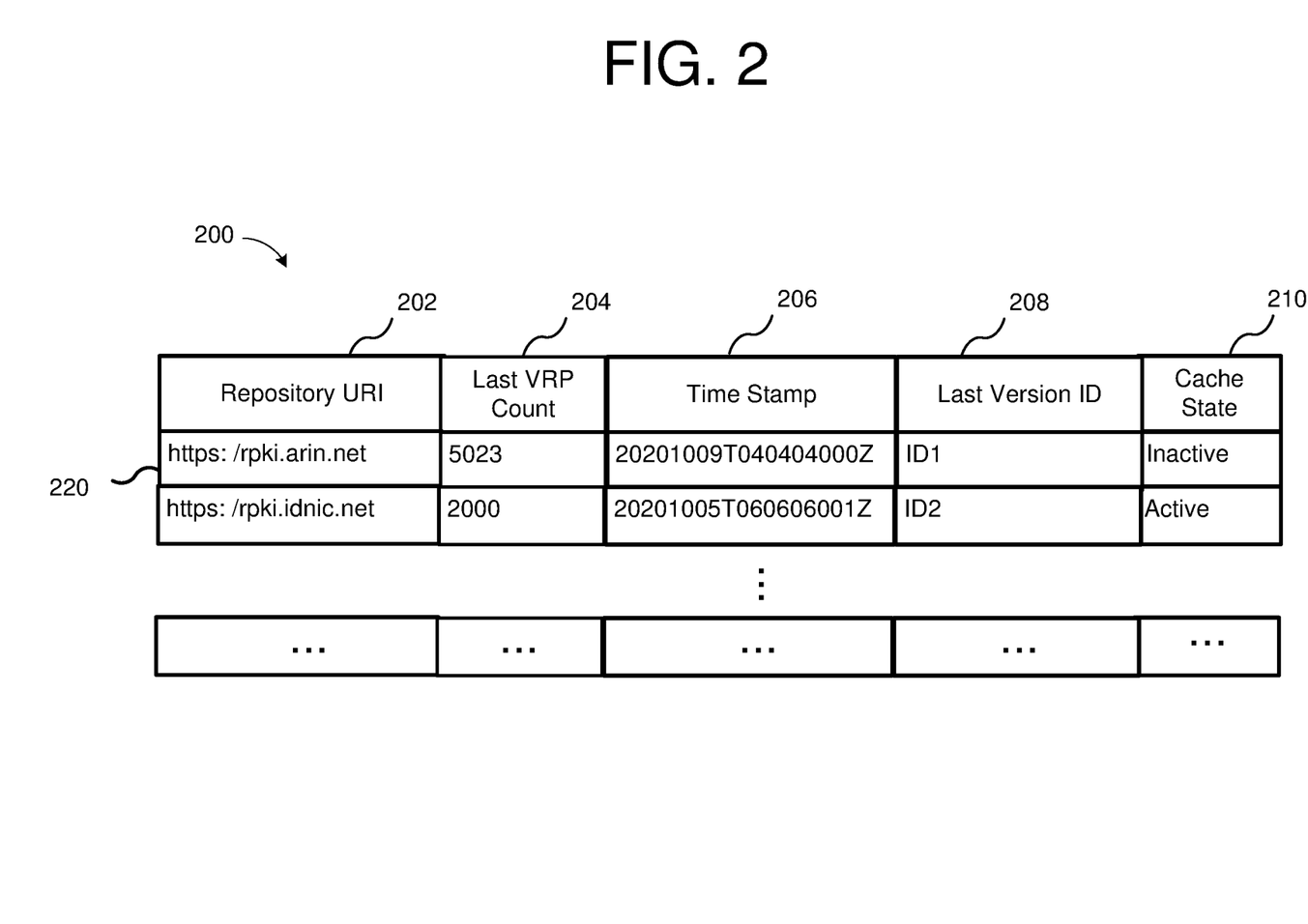
FIG. 2 shows an example of a data structure storing repository data.

Turning briefly to FIG. 2, a data structure 200 stores repository data, wherein each entry 220 can include the repository name or identification 202, a count 204 of VRPs last calculated for the repository, a time stamp 206, a last version identification (ID) 208, and a state 210 of the repository. The last version 208 can include a link to the last stored set of VRPs. The repository identification 202 can include the URL/URI of the repository. The state 210 can have the value of "active" or "inactive". Some repositories may often have problems, for example, going off-line repeatedly, and some take a while to have their problems fixed. These repositories can be indicated with the "inactive" state. For a repository with "inactive" state, the system can automatically substitute the last stored VRPs for that repository. The last stored set of VRPs can be stored in the same database or stored in a different database in the same cache memory 108. In some examples, the VRPs can be stored with versioning, where a link 208 to older versions of the data is maintained. The data can also be stored in files.

When the VRP caching sub-system 106 (FIG. 1) detects that the VRP count of a repository drops, it can substitute in a stored set of VRPs of the repository. For example, the VRP caching sub-system 106 can detect that a count of a new VRP set 112 drops below a threshold as compared to stored set. Or the VRP caching sub-system 106 can detect that a count of the new VRP set 112 drops to or below another threshold. In some embodiments, the stored set can be stored in the database 114.

In some embodiments, instead of substituting in the whole set of VRPs, the VRP caching sub-system 106 can substitute in only individual VRPs from the stored VRP set. For example, at 116, the VRP caching sub-system 106 can substitute in only VRP-sub from the database 114 for the VRP set 112.

After the VRP set 112 of the repository has been created and any substitution done, the VRP set 112 with its own Version ID and time stamp can be stored in the database 114. As further described below, the system 102 can retrieve VRPs from the database 114 to populate the intermediate storage (or buckets) 142-148. Then at 153, a RTR service 154 can distribute the VRPs 152 in the buckets 142-148 to the router groups 160-166. Once receiving the VRPs, a router can use the information to update routes in its table, including allowing or rejecting routes. For example, a router can update its table based on the route validation states.

The route monitoring sub-system 102 can control, support and monitor a network, or networks, that include one or more groups of routers 160-166. In some examples, the routers can be grouped by regions. These groups are depicted in FIG. 1 as 160-166, but there can be more or less groups. The route validating sub-system 104 can facilitate the distribution of routing information in VRPs to the routers, which then can validate the information and advertise, or announce, them among the routers.

In some embodiments, the route validating sub-system 104 can periodically (e.g., every 5 minutes, but other times are also possible) download route information 124 from global routing tables 132 (e.g., from RIPE NCC's Routing Information Service (RIS)), and network operators). The route information 124 can be or can include route advertisements. The route information can include, for example, a prefix, a maximum length, and an origin AS. In some implementations, the route validating sub-system 104 can validate the route information 124, resulting in each route being valid, unknown or invalid. A valid route can be or can include that the prefix and AS pair are found in a database of route information, for example as maintained in the storage 142-148 or in the VRP cache 108. An "unknown" route can mean that the prefix is not among the prefixes or prefix ranges in the database. An "invalid" route can mean that the prefix is found, but either the corresponding AS received is not the AS that appears in the database, or the prefix length is longer than the maximum length permitted in the database. In some embodiments, the route validating sub-system 104 can validate the route information 124 using route origin validation.

In some embodiments, the route validating sub-system 104 can detect significant transition(s) in route data as compared to VRPs stored in storage areas 142-148 and in VRP cache 108. The transition can be, for example, from valid to invalid, or from valid to unknown. For example, the route validating sub-system 104 can perform two calculations and analyze the results to make decision regarding any transition. In the first calculation, at reference 170, the route validating sub-system 104 can calculate the validated route information 124 against the route information in the new VRP sets (in VRP cache 108) which are to be, but not yet, distributed to the routers. In the second calculation, at reference 172, the route validating sub-system 104 can calculate the validated route information 124 against the VRPs in storage areas 142-148 which have been distributed. The route validating sub-system 104 can then analyze the results from the two calculations to make decision regarding any transition, for example, transition of valid routes to invalid routes or valid routes to unknown routes. In an example, the route validating sub-system 104 can determine whether the transition is at or exceeds a pre-determined threshold. If it is at or exceeds the pre-determined threshold, the route validating sub-system 104 can set an alarm 170. In an example, the transition can indicate a significant valid count drop in the current download as compared to a previous download. In another example, the route validating sub-system 104 can detect that the valid count drops to or below another pre-determined threshold. For example, the current valid count can fall below a pre-determined number or fall to near zero, etc. The alarm 170 can be implemented so that it can trigger notification to cause a stop in the distribution of VRPs to the routers. The alarm can also request or involve intervention from an operator, such as a system administrator.

In some embodiments, the algorithm used by route validating sub-system 104 can include determining if a route is covered by a VRP. A route can be covered if the IP prefix of the route falls within the IP prefix and max length of a VRP. For example, a route for 10.0.2.0/24 is covered by a VRP with an IP prefix of 10.0.0.0/16 max length 24. There can be multiple algorithms to compare each route to each VRP. In an example, the route validating sub-system 104 can compare each route to each VRP by iterating over the routes and for each route iterating over the VRPs. In another example, the route validating sub-system 104 can load all VRPs into a trie data structure, then iterate over the routes looking them up in the trie. In another example, the route validating sub-system 104 can load all VRPs into a binary search tree that is overlap aware, then iterate over the routes looking them up in the binary search tree. Other algorithms are also contemplated.

In some embodiments, the route validating sub-system 104 can perform the calculations within a pre-determined period of time, for example, within five minutes.

At a pre-determined time, an RTR service 154 can then distribute the VRPs to the routers. In some implementations, the RTR service 154 can distribute the VRPs in stages. For example, the routers can be logically grouped in groups of routers (e.g., routers in a same region or regions), as shown at 160, 162, 164, and 166. Additionally, the storage areas 142-148 can also be organized based on the router groups. For example, as a first part of a staged distribution, the RTR service 154 can transmit the VRPs in the storage area 142 to router group 160. The RTR service 154 can then wait for the monitoring sub-system 102 to report that the distribution is complete. As a second part of the staged distribution, the RTR service 154 can then send out VRPs in the storage area 144 to router group 162. The same process continues until all VRPs are sent to all of the router groups. In some embodiments, when a distribution of VRPs to a router group encounters a problem, the distribution can still continue with the next router group. Once receiving the VRPs, a router can use the information to update routes in its table, including allowing or rejecting routes. For example, a router can update its table based on the route validation states.

Figure 3:
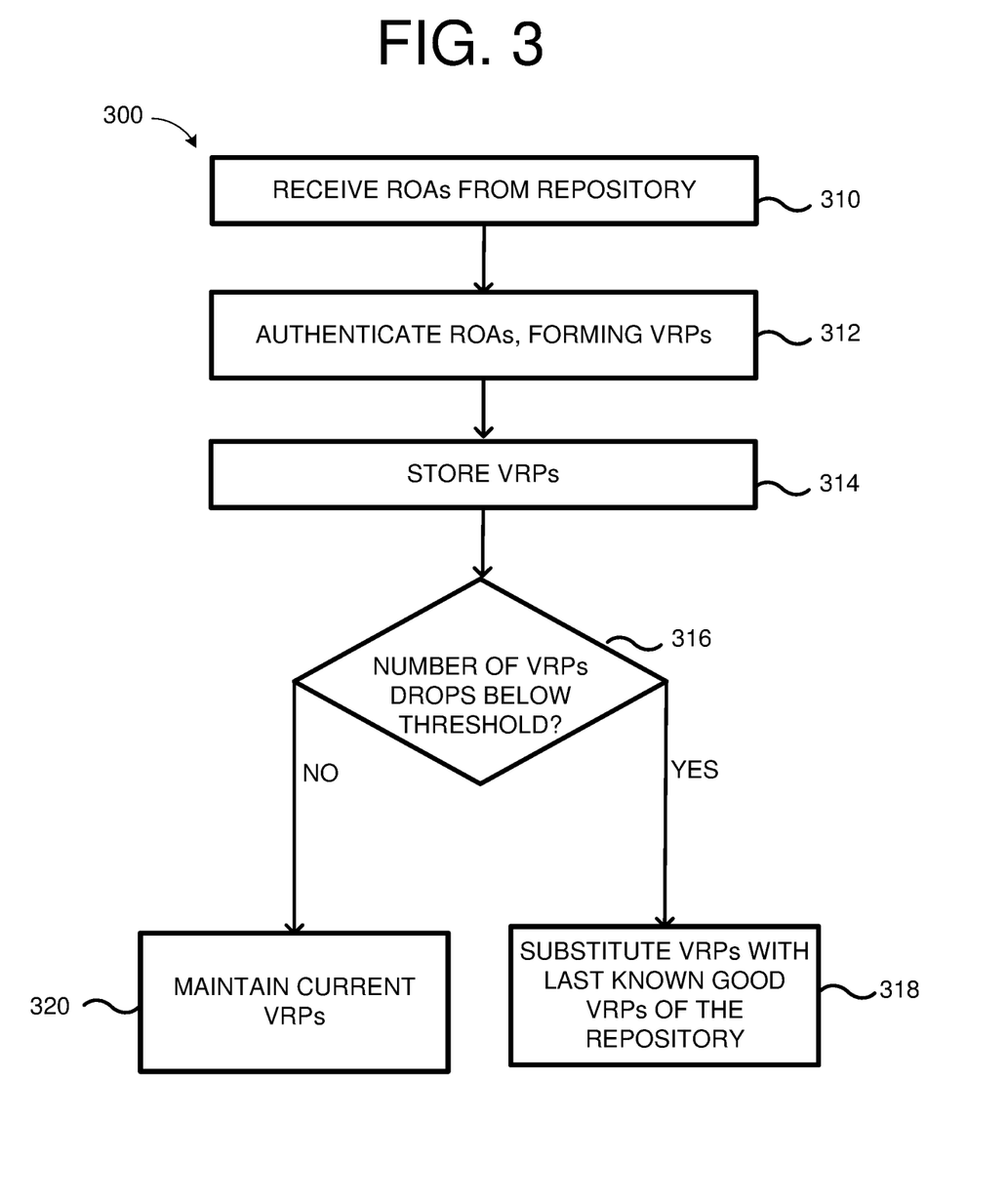
FIG. 3 shows an example flowchart of a method for a VRP caching sub-system for maintaining reliable VRP sets.

FIG. 3 is a flowchart of a method 300 for maintaining reliable VRP sets, according to some embodiments. In process block 310, a VRP caching sub-system, such as VRP caching sub-system 106 of FIG. 1, can download or receive ROAs from some predetermined sources (e.g., from repositories of ROAs). In process block 312, the VRP caching sub-system can authenticate the ROAs. For example, the VRP caching sub-system can include an RPKI validator, such as validator 107, which can perform RPKI validation on the ROAs to authenticate that the ROAs are cryptographically correct (e.g., signed by authorized entity and prefix belongs to correct entity). Once an ROA is validated, the resulting object is referred to as validated ROA payload (or VRP). In process block 314, the VRPs can be stored in a database. In some examples, the VRP caching sub-system can download and validate ROAs repository by repository and can store VRPs per repository in the database. For example, the VRPs can be stored in a cache memory 108. In process block 316, the VRP caching sub-system can determine if the VRP count of a repository has dropped. For example, the VRP caching sub-system can determine that a count of a new VRP set drops below a threshold as compared to a last stored set. Or the VRP caching sub-system can determine that a count of the new VRP set drops to or below another threshold. In some embodiments, the last stored set can be stored in a database. For example, the last stored VRPs can be stored in a cache memory 108. In process block 318, if the VRP caching sub-system determines that the VRP count of a repository has dropped, the VRP caching sub-system can substitute in a last stored set of VRPs of the repository. In some embodiments, instead of substituting in the whole set of VRPs, the VRP caching sub-system can substitute only the VRPs which ROAs do not pass the RPKI validation. Otherwise, if process block 316 is answered in the negative, then in process block 320, the current VRPs, for example, the VRP set from process block 312, are maintained without substitution.

Figure 4:
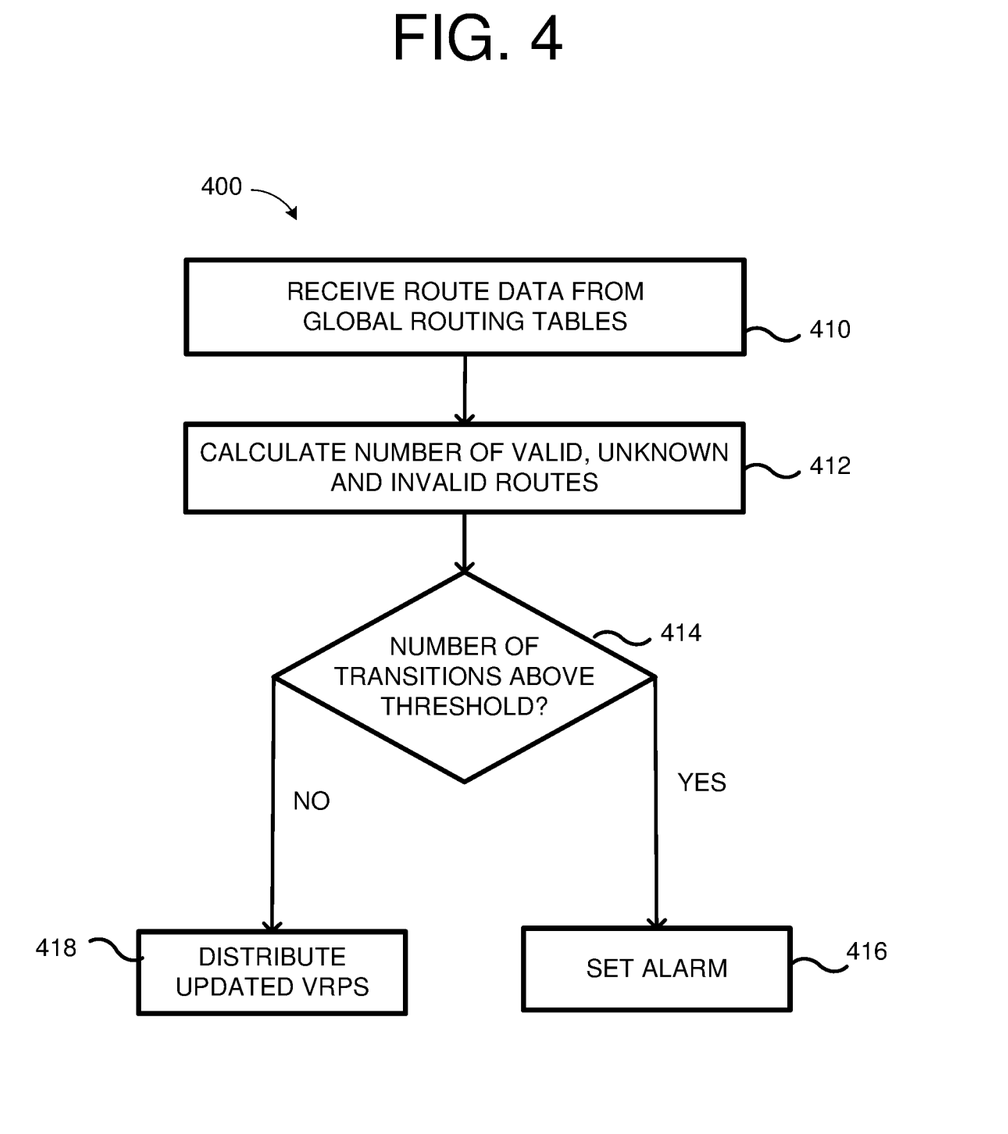
FIG. 4 shows an example flowchart of a method for a route validation sub-system for maintaining reliable VRP sets.

FIG. 4 is a flowchart of a method 400 for maintaining reliable VRP sets, according to some embodiments. In process block 410, a route validating sub-system, such as route validating sub-system 104 of FIG. 1, can download or receive route information from global routing tables (e.g., from RIPE NCC's Routing Information Service (RIS), and network operators). For example, the route validating sub-system can download route information periodically (e.g., every 5 minutes, but other times are also possible). In some embodiments, the route validating sub-system can validate the route information, resulting in each route being valid, unknown or invalid. And in process block 412, the route validating sub-system can calculate the number of valid, unknown or invalid routes. In some embodiments, the route validating sub-system can detect significant transition(s) in route data as compared to VRPs, for example, VRPs stored in storage areas 142-148 and in VRP cache 108 of FIG. 1. The transition can be, for example, from valid to invalid, or from valid to unknown. For example, the route validating sub-system can perform two calculations and analyze the results to make decision regarding any transition. In the first calculation, the route validating sub-system can calculate the validated route information against the route information in new VRP sets which are to be, but not yet, distributed to the routers. In the second calculation, the route validating sub-system can calculate the validated route information against the VRPs in storage areas which have been or expected to be distributed. The route validating sub-system can then analyze the results from the two calculations to make decision regarding any transition, for example, of valid routes to invalid routes or valid routes to unknown routes. In an example, the route validating sub-system can determine whether the transition of valid to invalid routes is at or exceeds a pre-determined threshold. For example, a transition that exceeds a threshold difference between the two results. Or a transition that exceeds another threshold (e.g., 1000). If decision block 414 is answered in the affirmative, then in process block 416, an alarm is set indicating that the threshold has been exceeded. The alarm can trigger notifications to cause a stop in the distribution of VRPs to the routers. The alarm can also request or involve intervention from an operator, such as a system administrator. Alternatively, if decision block 414 is answered in the negative, then the VRPs can be distributed (process block 418).

Figure 5A:
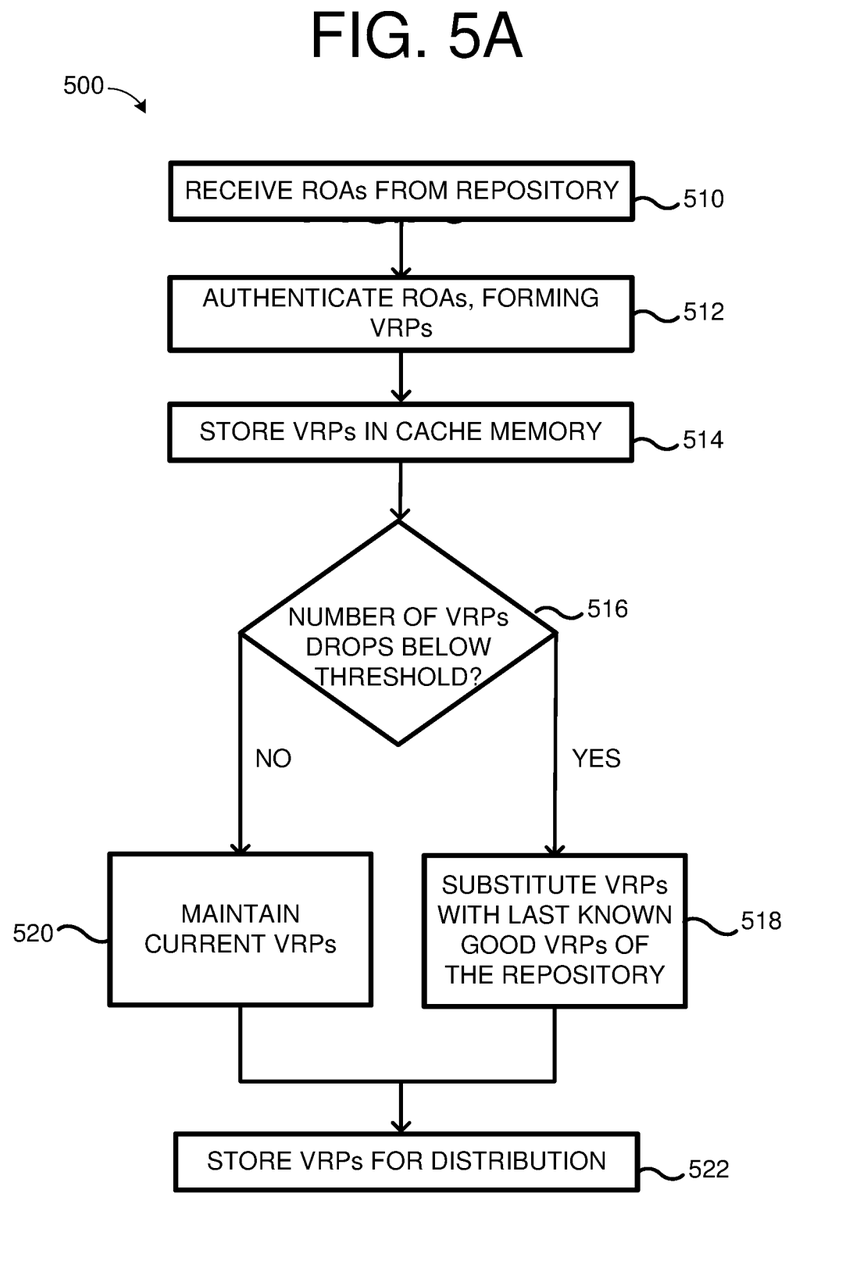
FIGS. 5A and 5B shows example flowcharts of a method for limiting the distribution of invalid routing information to routers.
Figure 5B:
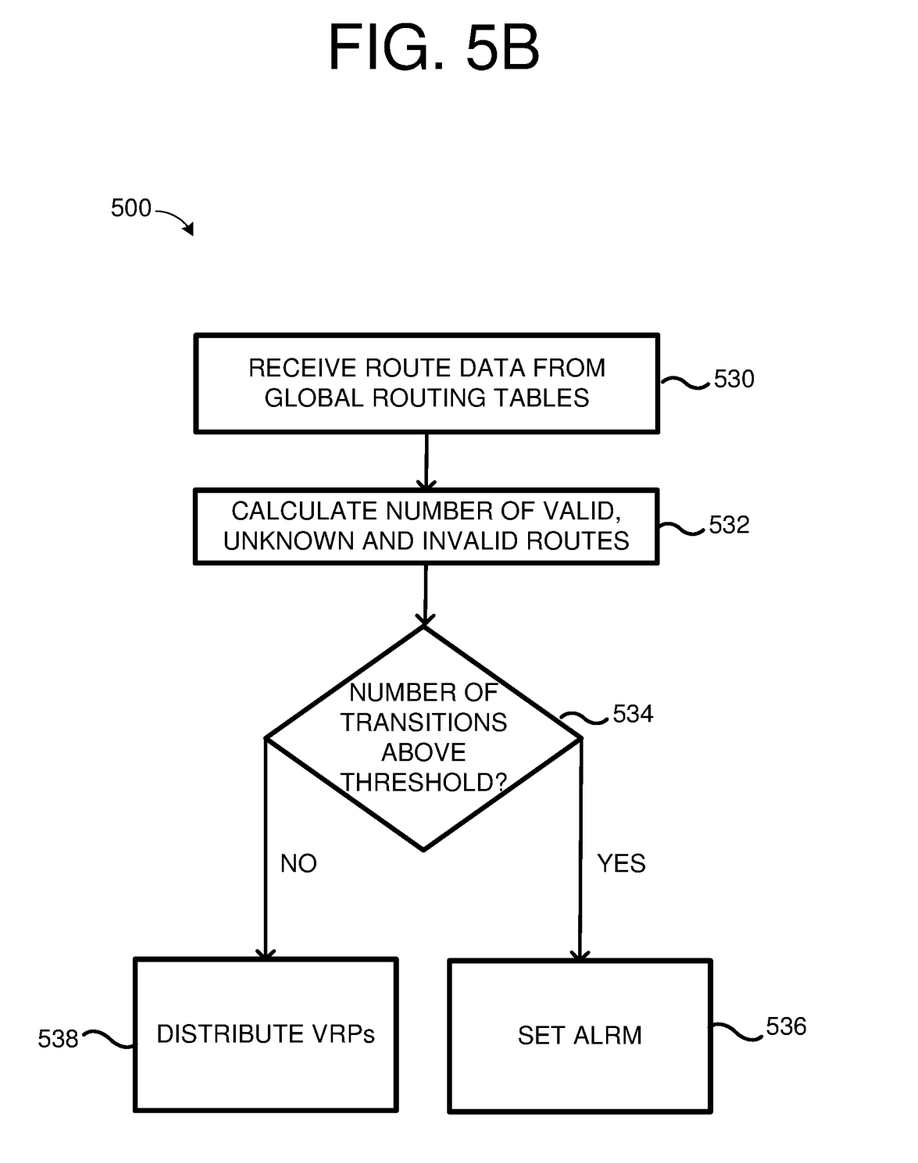

FIGS. 5A and 5B show an example flowchart of a method 500 for obtaining and distributing routing information to routers, according to some embodiments. In process block 510 of FIG. 5A, a VRP caching sub-system, such as VRP caching sub-system 106 of FIG. 1, can download or receive ROAs from some predetermined sources (e.g., from repositories of ROAs). In process block 512, the VRP caching sub-system can authenticate the ROAs. For example, the VRP caching sub-system can include an RPKI validator, such as validator 107 of FIG. 1, which can perform RPKI validation on the ROAs to authenticate that the ROAs are cryptographically correct (e.g., signed by authorized entity, and prefix belongs to correct entity). In process block 514, the VRPs can be stored in a cache memory, e.g., a database in the cache memory 108. In some examples, the VRP caching sub-system can download and validate ROAs repository by repository and can store VRPs per repository in the database. In process block 516, the VRP caching sub-system can determine if the VRP count of a repository drops below a threshold. For example, the VRP caching sub-system can determine that a count of a new VRP set drops below a threshold as compared to a last stored set. Or the VRP caching sub-system can determine that a count of the new VRP set drops to or below another threshold. In some embodiments, the last stored set can be stored in a database, e.g., in the cache memory 108. In process block 518, if the VRP caching sub-system determines that the VRP count of a repository has dropped to or below a threshold, the VRP caching sub-system can substitute in a last stored set of VRPs of the repository. In some embodiments, instead of substituting in the whole set of VRPs, the VRP caching sub-system can substitute only the VRPs that do not pass the RPKI validation. Otherwise, if process block 316 is answered in the negative, then in process block 520, the current VRPs are maintained without substitution. In process block 522, the VRP caching sub-system can store either the substituted VRP set (process block 518) or the current VRP set (process block 520) in a storage area for distribution to the routers.

In process block 530 of FIG. 5B, a route validating sub-system, such as route validating sub-system 104 of FIG. 1, can download or receive route information from global routing tables (e.g., from RIPE NCC, and network operators). For example, the route validating sub-system can download route information periodically (e.g., every 5 minutes, but other times are also possible). In some embodiments, the route validating sub-system can validate the route information, resulting in each route being valid, unknown or invalid. And in process block 532, the route validating sub-system can detect significant transition(s) in route data as compared to VRPs, for example, new VRPs and VRPs stored in storage areas. The transition can be, for example, from valid to invalid, or from valid to unknown. For example, the route validating sub-system can perform two calculations and analyze the results to make decision regarding any transition. In the first calculation, the route validating sub-system can calculate the validated route information against the route information in new VRP sets which are to be, but not yet, distributed to the routers. In the second calculation, the route validating sub-system can calculate the validated route information against the VRPs in storage areas which have been or expected to be distributed. In process block 534, the route validating sub-system can then analyze the results from the two calculations to make decision regarding any transition, for example, transition of valid routes to invalid routes or valid routes to unknown routes. In an example, the route validating sub-system can determine whether the transition of valid to invalid routes is at or exceeds a pre-determined threshold. For example, the route validating sub-system can determine that the valid count difference between the two results is at or exceeds a threshold. Or the route validating sub-system can determine that the transition exceeds another threshold (e.g., 1000). If decision block 534 is answered in the affirmative, then in process block 536, an alarm is set indicating that the threshold has been exceeded. The alarm can trigger notifications to cause a stop in the distribution of VRPs to the routers. The alarm can also request or involve intervention from an operator, such as a system administrator. Alternatively, if decision block 534 is answered in the negative, then in process block 538 the VRPs in the storage area (process block 522) can be distributed.

Figure 6:
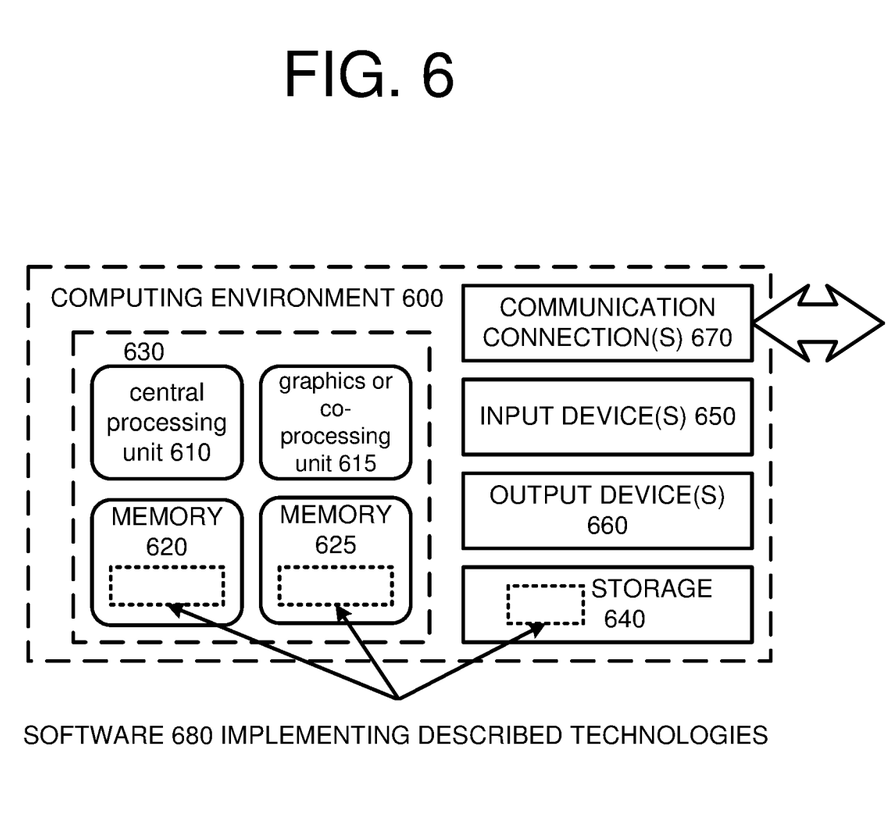
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.)

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer executable method comprising:
receiving, by a caching sub-system, one or more Resource Public Key Infrastructure (RPKI) cryptographically signed Route Origin Authorizations (ROAs) from a plurality of repositories;
authenticating, by the caching sub-system, the ROAs received from the plurality of repositories, forming Validated ROA Payload (VRP) sets, one VRP set for each of the plurality of repositories;
storing, by the caching sub-system, the VRP sets in a cache memory, wherein each entry of each VRP set includes a repository network address, a VRP count, a last version identification, a timestamp, and a state;
determining, by the caching sub-system, that the VRP count of a VRP set is at or below a first threshold;
substituting, by the caching sub-system, the VRP set with a last stored VRP set, forming a substituted VRP set;
storing, by the caching sub-system, the substituted VRP set in a storage area for a distribution to routers, wherein the storage area stores VRPs for a group of pre-determined routers;
receiving, by a route validating sub-system, route information data from a global routing table;
calculating, by the route validating sub-system, a number of valid routes, a number of unknown routes, and a number of invalid routes in the route information data received from the global routing table;
determining, by the route validating sub-system, that a transition of route information data is at or above a second threshold; and
setting, by the route validating sub-system, an alarm to stop the distribution of VRPs in the storage area to the group of pre-determined routers.

2. The method of claim 1, wherein the last version identification includes a link to the last stored VRP set.

3. The method of claim 1, wherein determining that the VRP count of a VRP set is at or below the first threshold includes detecting that the VRP count is below a VRP count of the last stored VRP set.

4. The method of claim 1, wherein determining that a transition of route information data is at or above the second threshold includes analyzing the number of valid routes against the substituted VRP set and analyzing the number of valid routes against the stored VRP set.

5. The method of claim 1, wherein the last stored VRP set was saved in the cache memory.

6. The method of claim 1, wherein during the distribution of VRPs to routers is done in stages, each stage includes a distribution to a pre-determined group of routers.

7. The method of claim 6, wherein each successive distribution stage begins after a previous stage has completed.

8. A system configured to:
receive one or more Resource Public Key Infrastructure (RPKI) cryptographically signed Route Origin Authorizations (ROAs) from a plurality of repositories;
authenticate the ROAs received from the plurality of repositories to create Validated ROA Payload (VRP) sets, one VRP set for each of the repositories;
store the VRP sets in a memory, wherein each entry of each VRP set includes a repository network address and a VRP count;
determine that the VRP count of a VRP set is at or below a threshold; and
substitute the VRP set with a last stored VRP set, thereby creating a substituted VRP set.

9. The system of claim 8, wherein each entry of each VRP set further includes a link to the last stored VRP set.

10. The system of claim 8, wherein determining that the VRP count of a VRP set is at or below a threshold includes detecting that the VRP count is below a VRP count of the last stored VRP set.

11. The caching sub-system of claim 8, wherein the VRP sets are stored in the memory per repository.

12. The system of claim 8, wherein the saved last known valid VRP set was saved in the cache memory.

13. The system of claim 8 further configured to store the substituted VRP set in a storage area, wherein the storage area stores VRPs for a group of pre-determined routers.

14. The system of claim 13 further configured to distribute the substituted VRP set from the storage area as part of a distribution executed in stages.

15. The system of claim 14, wherein each successive distribution stage begins after a previous stage has completed.

16. A system configured to:
receive route information data from a global routing table;
calculate, using the route information, a number of valid routes, a number of unknown routes, and a number of invalid routes;
determine that a transition of route information data is at or above a threshold; and
prevent distribution of route information data in a storage area;
wherein the storage area contains Validated Route Origin Authorizations Payload (VRP) sets and wherein determining that the transition is at or above the threshold includes analyzing the number of valid routes against the VRP sets in the storage area.

17. The route validating sub-system of claim 16, wherein determining that the transition is at or above the threshold further includes analyzing the number of valid routes against a last stored sets of VRPs.

18. The route validating sub-system of claim 16, wherein preventing the distribution of route information data includes setting an alarm.

* * * * *